(12) United States Patent
Zhao et al.

(10) Patent No.: US 9,037,442 B2
(45) Date of Patent: May 19, 2015

(54) DYNAMICS SIMULATION

(75) Inventors: Yan Zhao, Santa Clara, CA (US); Hou T. Ng, Campbell, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 349 days.

(21) Appl. No.: 13/534,365

(22) Filed: Jun. 27, 2012

(65) Prior Publication Data

US 2014/0005993 A1    Jan. 2, 2014

(51) Int. Cl.
*G06G 7/48*   (2006.01)
*B41F 33/00*  (2006.01)

(52) U.S. Cl.
CPC .................. *B41F 33/0045* (2013.01)

(58) Field of Classification Search
CPC ...... C09D 11/40; C09D 11/322; C09D 11/30; C09D 11/38; C09D 11/101; C09D 11/54; C09D 5/028; C23C 24/08
USPC ............................................................. 703/6
See application file for complete search history.

(56) References Cited

U.S. PATENT DOCUMENTS

| 5,239,292 | A | 8/1993 | Willan | |
|---|---|---|---|---|
| 7,151,603 | B2* | 12/2006 | Kellie | 356/342 |
| 7,378,459 | B2 | 5/2008 | Nishiguchi | |
| 8,164,780 | B2 | 4/2012 | Katoh et al. | |
| 2011/0300305 | A1* | 12/2011 | Li et al. | 427/553 |

FOREIGN PATENT DOCUMENTS

KR   20100099393   9/2010

OTHER PUBLICATIONS

Bonn et al. ("Wetting and spreading", Review of Modern Physics, 2009).*
Tseng et al. ("Dispersion and rheology of nickel nanoparticle inks", Springer Science + Business Media, Inc,2006 ).*
Croucher et al. ("Design Criteria and Future Directions in Inkjet Ink Technology", American Chemical Society,1989).*
Anonymous Article on ip.com ("Inkjet Printing Inks Containing Encapsulated Pigments", 2007).*
Socol, Y., et al (Jan./ Feb. 2004). "Method for in Situ Measurement of Ink Jet Printed Ink Drops." < http://www.zabanlab.com/upload/pdf_publication/61-61.pdf> on pp. 15-21; vol. 48; Issue: 1.

(Continued)

*Primary Examiner* — Omar Fernandez Rivas
*Assistant Examiner* — Iftekhar Khan
(74) *Attorney, Agent, or Firm* — Brooks, Cameron & Huebsch PLLC

(57) ABSTRACT

Dynamics simulations are described. Dynamics simulations can include identifying a number of ink related components and a number of printing interactions. Dynamics simulations can also include generating a granular representation of the number of ink related components and calculating a number of Hamaker constants based on the granular representation of the number of ink related components. Dynamics simulations can include performing a dynamics simulation based on the number of Hamaker constants, the granular representation of the number of ink related components, and the number of printing interactions.

15 Claims, 3 Drawing Sheets

(56) References Cited

OTHER PUBLICATIONS

Yang, L. (Apr. 2003) "Ink-Paper Interaction." < http://www.google.com/url? sa=t&rct=j&q=&esrc=s&source=web&cd=1&ved=0CHMQFjAA&url=http%3A%2F%2Fciteseerx.ist.psu.edu%2Fviewdoc%2Fdownload%3Fdoi%3D10.1.1.134.9213%26rep%3Drep1%26type% 3Dpdf&el=v5inT_ucF8nSrQeB8K2BAg&usg=AFQjCNEngEnV7grF7PkBJn3qEb8W0cvV6w >. 161 Pages.

Mezhericher, M., Levy, A. and Borde, I. (Mar. 2010) 'Theoretical Models of Single Droplet Drying Kinetics: A Review', Drying Technology, 28: 2, 278-293.

Jamaleddine, Tarek J. and Ray, Madhumita B. (Mar. 2010) 'Application of Computational Fluid Dynamics for Simulation of Drying Processes: A Review', Drying Technology, 28: 2, 120-154.

Yan Zhao, Hou T. Ng, and Eric Hanson. (Aug. 2009). "Computation of Nonretarded London Dispersion Coefficients and Hamaker Constants of Copper Phthalocyanine," J. Chem. Theory Comput. 2010, 6, 491-498.

* cited by examiner

DYNAMICS SIMULATION

BACKGROUND

A printing process can contribute to printing performance. A printing process can include an ink composition and page attributes. Understanding the behavior of ink composition and page attributes can contribute to printing performance.

DETAILED DESCRIPTION

Figure 1:
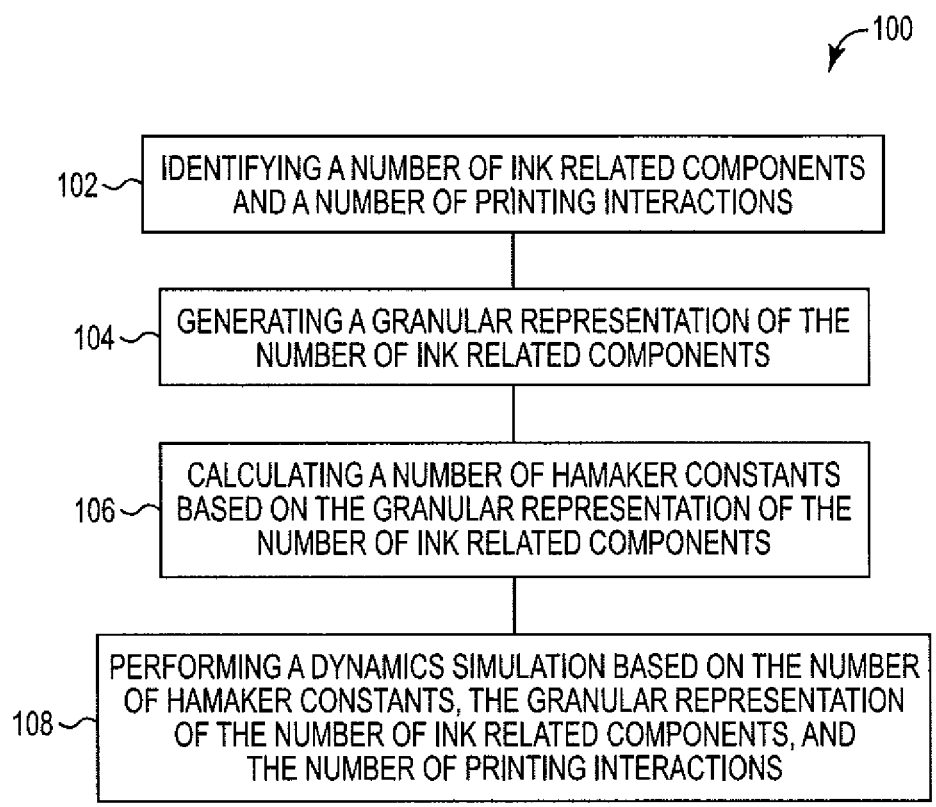
FIG. 1 is a flow chart illustrating an example of a method for dynamics simulation according to the present disclosure.

Understanding a printing process can allow a designer of the printing process to modify the printing process to enhance printing performance. A printing process can include the creation of an ink composition and a process by which the ink composition can be fused, e.g., printed, onto an intermediate transfer medium (ITM). An ink composition can describe an ink that can be used in a printing process. An ink composition can include wet ink compositions, e.g., wet toner, and dry ink compositions, e.g., dry toner, among other ink compositions. An ink composition can be fused onto an ITM through a number of processes. For example, an ink composition can be fused onto an ITM through a drying process, an electrostatic ink fusion process, and/or other ink fusion processes. An ITM can be a medium on which an ink composition is fused. An ITM can be printing paper with a number of properties. An ITM can be composed of a number of materials.

Understanding a printing process can include understanding how the different ink related components and/or materials interact in the printing process. Ink related components can include an ink composition, an ITM, and/or other materials used in a printing process. Understanding the interactions between ink related components can provide a better understanding of the printing process and can allows modifications to be made to the printing process that produce a higher quality printed product than a printing process where the printing interactions are not understood.

Previous approaches to understanding a printing process can include extensive experiments and measurements of those experiments. Experiments can ignore chemical interactions that provide insights that can be used to improve the printing process. Furthermore, previous approaches that simulate a printing process do not have the adequate bandwidth to simulate a system at a micron level or lower, such as at the nanometer level.

In a number of examples of the present disclosure, a printing process can be simulated while maintaining a detailed description of a number of ink related components. A simulation, e.g., dynamics simulation, of the printing process can include a model of the printing process that allows for observations to be made regarding the printing process. The observations can include specific properties of interests such as an evaporation rate and an ink suspension thickness among others. A number of ink related components can be modeled using a granular representation of the number of ink related components. The granular representation of the number of ink related components can allow a simulation of the printing process to retain a detailed description of the number of ink related components while simplifying the processor resources required to perform the simulation of the printing process.

A number of Hamaker constants of the granular representation of the number of ink related components and the granular representation of the number of ink related components can be used to produce an interaction parameter matrix. An interaction parameter matrix can describe a number of forces that are exerted on a number of ink related components. An interaction parameter matrix can be used to perform a dynamics simulation of the printing process. Observations and measurements of the dynamics simulation of the printing process can be made to assist in future development of the printing process.

FIG. 1 is a flow chart illustrating an example of a method 100 for dynamics simulation according to the present disclosure. At 102, a number of ink related components and a number of printing interactions can be identified. A number of ink related components can include an ink composition, e.g., multi-component ink composition, an ITM, and/or other materials used in the printing process. A multi-component ink composition can include a number of materials that when combined produce ink. For example, a multi-component ink composition can be a liquid toner ink composition, inkjet ink composition, and a dry toner ink composition among others. A number of printing interactions can include a number of interactions that occur in the printing process. For example, a number of printing interactions can include a number of interactions that occur when a number of components are mixed to create an ink composition. A number of printing interactions can also include an interaction that occurs when the ink composition is deposited on an ITM.

At 104, a granular representation of the number of ink related components can be generated. A granular representation can include a loss of some level of detail in the representation of the number of ink related components. In a number of examples of the present disclosure, a granular representation can be conducted at a number of different scales. For example, a granular representation can be conducted at a molecular level.

At 106, a number of Hamaker constants can be used to model a number of interactions between two components of the same species. The Hamaker constants can describe the level of van der Waals forces between and/or among a number of ink related components. The Hamaker constants can be calculated using various inter-particle interaction energy functions.

At 108, a dynamics simulation can be performed based on a number of Hamaker constants, a granular representation of the number of ink related components, and the number of printing interactions. A dynamics simulation can include simulating a number of printing interactions that the number of ink related components undergo. In a number of examples of the present disclosure, the dynamics simulation can take place at a molecular level. The dynamics simulation can incorporate a number of conditions, e.g., printing conditions, that define the dynamics simulation. The number of printing conditions can include conditions at the time that a printing process takes place. For example, a number of printing conditions can include temperature and/or humidity among others.

A dynamics simulation can be performed to extract data that can be used to further develop the printing process. Extractable data, e.g., a set of properties of interest, can include data that is pertinent to the printing process. For example, extractable data can include an evaporation rate, ink suspension thickness, and/or ink coverage among other datasets. A dynamics simulation that is based on a number of Hamaker constants and a granular representation of a number of ink related components can allow a dynamics simulation to be performed at a molecular level within the confines of processing resources.

Figure 2:
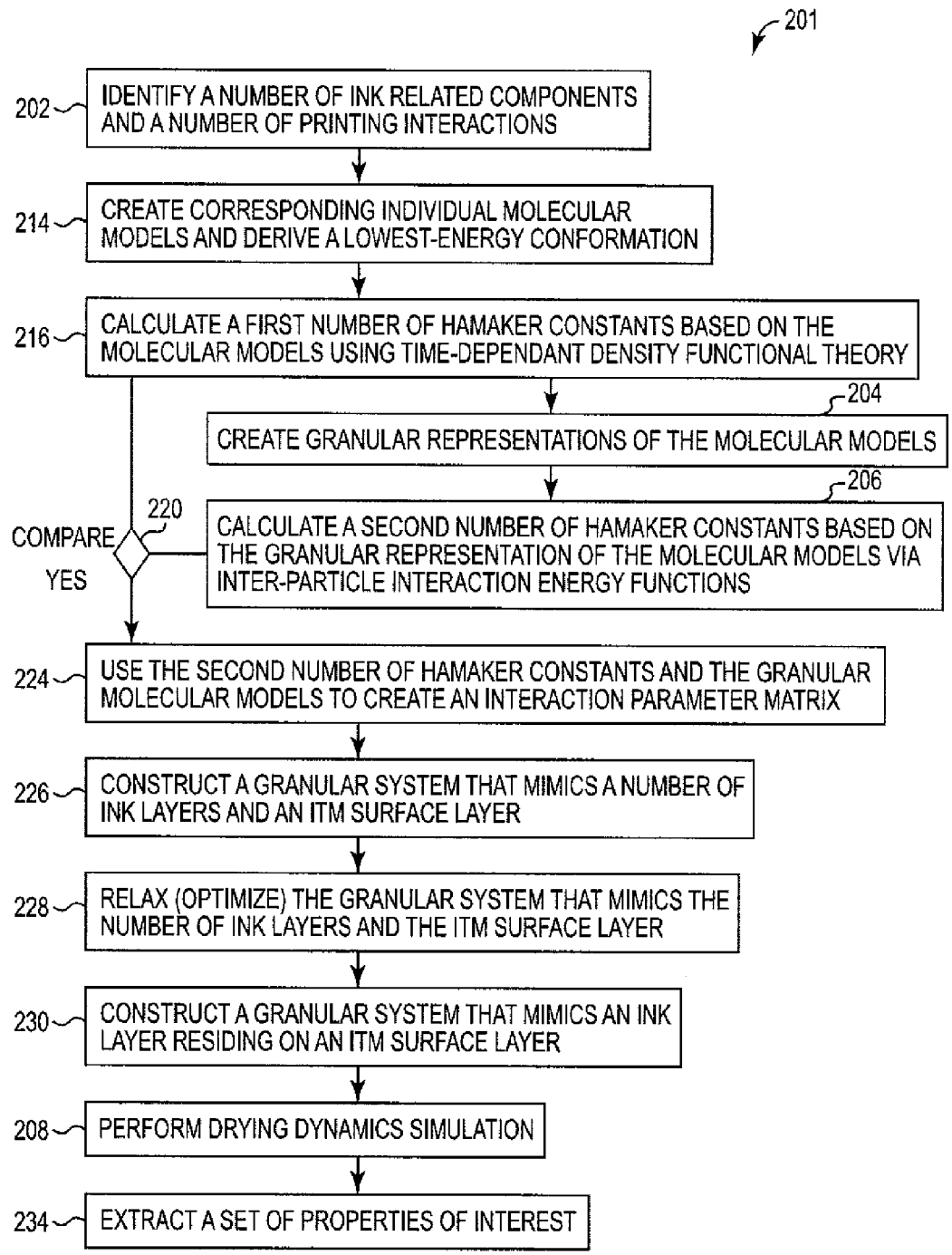
FIG. 2 is a flow chart illustrating an example of a method for dynamics simulation of a liquid toner drying on an ITM according to the present disclosure.

FIG. 2 is a flow chart illustrating an example of a method 201 for dynamics simulation of a liquid toner drying on an ITM according to the present disclosure. Although the example used in FIG. 2 applies specifically to drying a liquid toner on an ITM, the example can be applied to a number of printing processes that can use different toner types and/or different mediums. At 202, a number of ink related components and a number of printing interactions can be identified. For example, a carrier, a pigment, a first polymeric resin, a second polymeric resin, and an ITM surface layer can be identified. A carrier, a pigment, a first polymeric resin, and a second polymeric resin can define a liquid toner while the ITM surface layer can define an ITM unto which the liquid toner is deposited.

At 214, molecular models of the number of the ink related components can be created and a low-energy confirmation or, more specifically, a lowest-energy configuration can be derived. For example, a molecular model for a carrier, a molecular model for a pigment, a molecular model for a first polymeric resin, a molecular model for a second polymeric resin, and a molecular model for an ITM surface layer can be created. At 216, a first number of Hamaker constants can be calculated based on the molecular models using time-dependent density functional theory (TDDFT). A Hamaker constant that is calculated using TDDFT can be given as:

$$A_{11} = a\pi C_{11} \rho_1^2.$$

In the above equation, $C_{11}$ can be a van der Waals dispersion coefficient that can be calculated using TDDFT, $\rho_1$ can be a density of a molecule, and a can be an empirical parameter that can overcome a number of assumptions build into the above equation. A number of Hamaker constants can correspond to a number of molecular models of the number of ink related components.

At 204, a number of granular representations of the molecular models can be created. For example, a granular molecular model for a carrier, a granular molecular model for a pigment, a granular molecular model for a first polymeric resin, a granular molecular model for a second polymeric resin, and a granular molecular model for an ITM surface layer can be created. Creating a granular representation of the molecular models of the number of ink related components can also include creating a granular representation of a number of sub-components of the number of ink related components.

In a number of examples of the present disclosure, each of the number of ink related components can be created of a number of materials, e.g., sub-components. For example, an ITM layer can include a number of sub-components. Each of the number of materials in a number of ink related components can create and/or experience a number of forces. Each of the materials can be given a granular type to differentiate the different forces that can be associated with a material. For example, a release layer of an ITM can be given as a granular type C and a granular type Si while a layer underneath the release layer can be given as a granular type Fe. A charge directing agent in a liquid toner can be given as granular type CDe and granular type CDp. A carrier, a pigment, a first polymeric resin, and a second polymeric resin can each be represented as their own granular type. Table 1 shows a summary of a number of the granular types that can be used in a liquid toner drying printing process. A granular representation of the molecular models can be a simplified version of a number of molecular models of the ink related components. Table 1 shows a number of force field types that can be assigned to the number of granular types. A force field type can describe a number of forces that are exerted on a granular type. For example, granular type C can have a force field type Ra and granular type Si can have a force field type Rb.

TABLE 1

Example Granular Types and Force Field Types

| Granular Type | Force Field Type |
|---|---|
| C | Ra |
| CDe | SN |
| CDp | SP |
| Fe | Rb |
| Carrier | Iso |
| Pigment | Cyan |
| Poly A | F |
| Poly B | ACE |
| Si | Rb |

At 206, a second number of Hamaker constants can be calculated based on a number of granular molecular models via a number of inter-particle interaction energy functions. A number of inter-particle interaction energy functions can be derived from the inter-particle potential energy functions. The potential functions can be given as:

$$V_{12\_6} = \sum_{\substack{van\ der\ Waals \\ i,j\ pairs}} \left( \frac{A_{ij}}{r_{ij}^{12}} - \frac{B_{ij}}{r_{ij}^{6}} \right),$$

where: $A_{ij} = D_{ij}(R_{ij})^{12}$, and $B_{ij} = 2D_{ij}(R_{ij})^{6}$ $$V_{12\_4} = \sum_{\substack{van\ der\ Waals \\ i,j\ pairs}} \left( \frac{A_{ij}}{r_{ij}^{12}} - \frac{B_{ij}}{r_{ij}^{4}} \right),$$

where:

$$A_{ij} = \frac{1}{2} D_{ij}(R_{ij})^{12},\ \text{and}\ B_{ij} = \frac{3}{2} D_{ij}(R_{ij})^{4}$$

$$V_{9\_4} = \sum_{\substack{van\ der\ Waals \\ i,j\ pairs}} \left( \frac{A_{ij}}{r_{ij}^{9}} - \frac{B_{ij}}{r_{ij}^{4}} \right),$$

where:

$$A_{ij} = \frac{4}{5} D_{ij}(R_{ij})^{9},\ \text{and}\ B_{ij} = \frac{9}{5} D_{ij}(R_{ij})^{4}$$

$$V_{9\_6} = \sum_{\substack{van\ der\ Waals \\ i,j\ pairs}} \left( \frac{A_{ij}}{r_{ij}^{9}} - \frac{B_{ij}}{r_{ij}^{6}} \right),$$

where: $A_{ij} = 2D_{ij}(R_{ij})^{9}$, and $B_{ij} = 3D_{ij}(R_{ij})^{6}$ $$V_{buckingham} = \sum_{\substack{van\ der\ Waals \\ i,j\ pairs}} \left( A_{ij} e^{-\beta_{ij} r_{ij}} - \frac{B_{ij}}{r_{ij}^{6}} \right),$$

where $A_{ij}$, $B_{ij}$, $\beta_{ij}$ are parameters $$V_{Morse-dispersion} = \sum_{\substack{van\ der\ Waals \\ i,j\ pairs}} \left( D_{ij}[X_{ij}^2 - 2X_{ij}]f_{s,ij} - (1 - f_{s,ij})\frac{B_{ij}}{r_{ij}^6} \right)$$

where:

$$X_{ij} = \exp\left(-\frac{y}{2}\left(\frac{r_{ij}}{R_{ij}} - 1\right)\right),$$

and $f_{s,ij} = \frac{1}{1 + \exp(20(r_{ij} - R_{c,ij}))}$.

In the inter-particle potential energy functions, $r_{ij}$ can be an inter particle distance between two particles, $D_{ij}$ can be an equilibrium well depth, $R_{ij}$ can be an equilibrium distance, $B_{ij}$ can be a dispersion parameter, $R_{c,ij}$ can be a Morse dispersion switching distance, and y can be a scaling factor. In a number of examples of the present disclosure, other energy functions can be used. Using the potential energy functions, the inter-particle forces can be calculated at any inter-particle distance. With the calculated forces, the granular particle dynamics can be performed. The density of the system $\rho$ can be calculated from the dynamics calculation. A Hamaker constant of a molecule can be calculated as, $A_{11} = \pi B_{ij} \rho^2$.

At 220, the first number of Hamaker constants and the second number of Hamaker constants can be compared to determine whether the granular representation of the molecular models can be substituted for the molecular models. Comparing the first number of Hamaker constants and the second number of Hamaker constants can assure that the granular representation of the molecular models can substantially behave as the molecular models under a dynamics simulation. In a number of examples of the present disclosure, the first number of Hamaker constants and the second number of Hamaker constants can be compared to determine whether the parameters in the inter-particle potential energy function can give a granular representation of the components.

At 224, the second number of Hamaker constants and the granular representation of the molecular models can be used to create an interaction parameter matrix. An interaction parameter matrix can describe the forces that the different granular types place on themselves. For example, Table 2 shows an example interaction parameter matrix. An interaction parameter matrix can be used to create a granular force field profile. A force field profile can define a number of forces that are exerted on a granular type and from where those forces are being exerted. A granular force field profile can be used in a dynamics simulation.

TABLE 2

Example of an Interaction Parameter Matrix.

|  | Carrier | Pigment | Poly A | Poly B | SN | SP | C | Si |
|---|---|---|---|---|---|---|---|---|
| Carrier | 0.84 | 0.48 | 0.62 | 0.48 | 0.81 | 0.53 | 0.76 | 0.61 |
| Pigment | 0.48 | 1.22 | 0.98 | 1.11 | 0.51 | 1.05 | 0.53 | 0.93 |
| Poly A | 0.62 | 0.98 | 1.08 | 1.03 | 0.62 | 0.95 | 0.70 | 0.99 |
| Poly B | 0.48 | 1.11 | 1.03 | 1.20 | 0.53 | 1.13 | 0.51 | 1.04 |
| SN | 0.81 | 0.51 | 0.62 | 0.53 | 0.87 | 0.55 | 0.87 | 0.72 |
| SP | 0.53 | 1.05 | 0.95 | 1.13 | 0.55 | 1.18 | 0.48 | 1.08 |
| C | 0.76 | 0.53 | 0.70 | 0.51 | 0.87 | 0.48 | 0.89 | 0.65 |
| Si | 0.61 | 0.93 | 0.99 | 1.04 | 0.72 | 1.08 | 0.65 | 1.01 |

At 226, 228, and 230, a granular system that mimics the number of printing interactions can be constructed. For example, at 226, a granular system that mimics a number of ink layers and an ITM surface layer can be constructed. For example, the granular system that mimics the number of ink layers can be constructed from the specifications of an ink composition. For example, an ink composition can include a charging agent, a carrier, a pigment, a first polymeric resin, and a second polymeric resin. A charging agent can account for 0.2% of the ink composition. A carrier can account for 80.0% of the ink composition. A pigment can account for 4.2% of an ink composition. A first polymeric resin can account for 12.5% of an ink composition while a second polymeric resin can account for 3.1% of an ink composition. At 228, the granular system that mimics the number of ink layers and the ITM surface layer can be relaxed, e.g., optimize. Relaxing the granular system that mimics the number of ink layers can allow a dynamics simulation to converge. Relaxing the granular system can remove the noise that is introduced into the dynamics simulation when the granular molecular models are used instead of the molecular models. At 230, a granular system that mimics the number of printing interactions can be created. For example, the number of printing interactions can include an ink layer residing on an ITM surface layer.

At 208, a dynamics simulation can be performed. For example, an ink fusion and/or a drying dynamics simulation can be performed. The dynamics simulation can be performed under a number of printing conditions. The number of printing conditions can include conditions specific to the printing process. For example, a temperature under which the printing process is conducted can be 120 Celsius while a duration of the drying process can be 300 ms. A number of printing conditions can include more and/or less conditions than the above example. The dynamics simulation can be performed using an interaction parameter matrix.

At 234, a set of properties of interest can be extracted from the simulation. For example, in a drying dynamics simulation a residual carrier concentration, a carrier evaporation rate, an initial ink suspension thickness, a final ink suspension thickness, an ink layer thickness for 1-shot model, a final ink coverage, and a charging agent concentration in an ink interface, an ink, and ITM can be calculated. Table 3 shows an example of a set of properties of interest that can be extracted. For example, in a drying dynamics simulation at 120 Celsius a residual carrier concentration can be 3.8% as outlined in Table 3.

TABLE 3

Example of a set of prosperities of a printing process.

| Extractable data | @120° C. |
|---|---|
| Residual carrier concentration | 3.8% |
| Carrier evaporation rate | 2.2 × 10−12 g s−1 μm−2 |
| Initial/final ink suspension thickness | 6.5/2.1 (μm) |
| Ink layer thickness for 1-shot mode ($1^{st}$:$2^{nd}$:$3^{rd}$:$4^{th}$) | 2.1:2.9:4.2:5.8 (μm) |
| Final ink coverage | 93% |
| Charging agent concentration in ink interfaces:ink:ITM | 10:4:1 |

Figure 3:
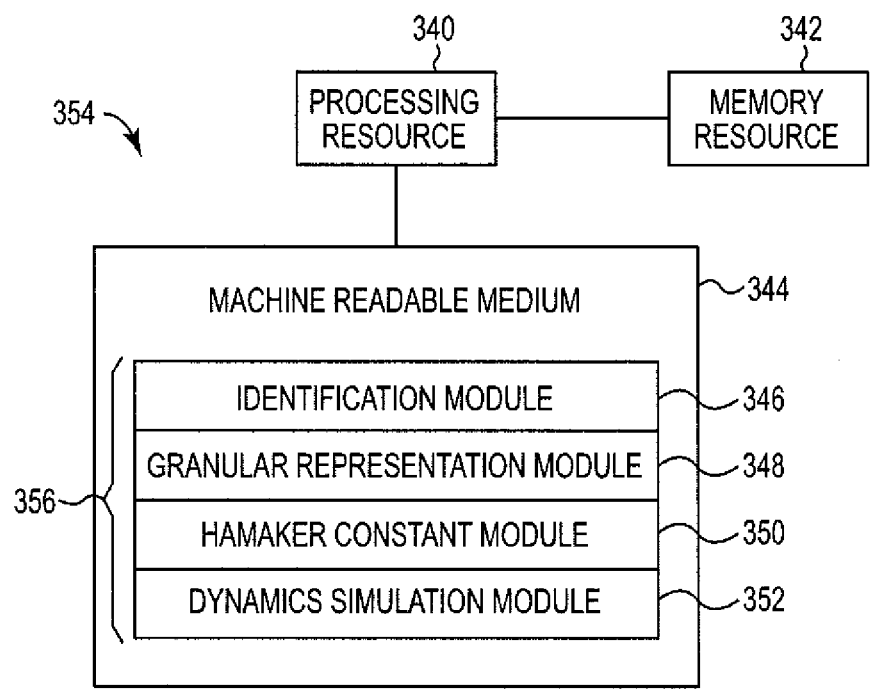
FIG. 3 illustrates an example computing device according to an example of the present disclosure.

FIG. 3 illustrates an example computing device 354 according to an example of the present disclosure. The computing device 354 can utilize software, hardware, firmware, and/or logic to perform a number of functions.

The computing device 354 can be a combination of hardware and program instructions configured to perform a number of functions. The hardware, for example, can include one or more processing resources 340, machine readable medium (MRM) 344, etc. The program instructions, e.g., computer-readable instructions (CRI) 356, can include instructions stored on the MRM 344 to implement a desired function, e.g., dynamics simulation.

MRM 344 can be in communication with a number of processing resources of more or fewer than 340. The processing resources 340 can be in communication with a tangible non-transitory MRM 344 storing a set of CRI 356 executable by one or more of the processing resources 340, as described herein. The CRI 356 can also be stored in remote memory managed by a server and represent an installation package that can be downloaded, installed and executed. The computing device 354 can include memory resources 342, and the processing resource 340 can be coupled to the memory resource 342.

Processing resource 340 can execute CRI 356 that can be stored on internal or external non-transitory MRM 344. The processing resource 340 can execute CRI 356 to perform various functions, including the functions described in FIG. 1 and FIG. 2.

The CRI 356 can include a number of modules 346, 348, 350, and 352. The number of modules 346, 348, 350, and 352 can include CRI 356 that when executed by the processing resource 340 can perform a number of functions.

The number of modules 346, 348, 350, and 352 can be sub-modules of other modules. For example, the granular representation module 348 and the Hamaker constants module 348 can be sub-modules and/or contained within a single module. Furthermore, the number of modules 346, 348, 350, and 352 can comprise individual modules separate and distinct from one another.

An identification model 346 can comprise CRI 356 and can be executed by the processing resource 340 to identify a number of ink related components and a number of printing interactions that are associated with a printing process. The number of ink related components can include an ink composition and an ITM.

A granular representation module 348 can comprise CRI 356 and can be executed by the processing resource 340 to create a granular representation of a molecular model of the number of ink related components. The granular representation can be created via a number of inter-particle interaction energy functions.

A Hamaker constants module 350 can comprise CRI 356 and can be executed by the processing resource 340 to create a second number of Hamaker constants based on the granular representation of the molecular models. The second number of Hamaker constants can be compared to a first number of Hamaker constants that are based on the molecular models of the number of ink related components. Comparing the second number of Hamaker constants with the first number of Hamaker constants can assist in evaluating whether the granular representation of the molecular models behave as the molecular models.

A dynamics simulation module 352 can simulate a number of printing interactions. The number of printing interactions can be simulated using the granular representation of the molecular models and the second number of Hamaker constants. A dynamics simulation can be performed under a number of printing conditions. A set of properties of interest can be extracted from the dynamics simulation.

A non-transitory MRM 344, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 344 can be integral or communicatively coupled to a computing device in a wired and/or wireless manner. For example, the non-transitory MRM 344 can be an internal memory, a portable memory, and a portable disk, or a memory associated with another computing resource, e.g., enabling CRIs 356 to be transferred and/or executed across a network such as the Internet.

The MRM 344 can be in communication with the processing resource 340 via a communication path 358. The communication path 358 can be local or remote to a machine, e.g., a computer, associated with the processing resource 340. Examples of a local communication path 358 can include an electronic bus internal to a machine, e.g., a computer, where the MRM 344 is one of volatile, non-volatile, fixed, and/or removable storage medium in communication with the processing resource 340 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 358 can be such that the MRM 344 is remote from a processing resource, e.g., processing resource 340, such as in a network connection between the MRM 344 and the processing resource, e.g., processing resource 340. That is, the communication path 358 can be a network connection. Examples of such a network connection can include local area network (LAN), wide area network (WAN), personal area network (PAN), and the Internet, among others. In such examples, the MRM 344 can be associated with a first computing device and the processing resource 340 can be associated with a second computing device, e.g., a Java® server. For example, a processing resource 340 can be in communication with a MRM 344, wherein the MRM 344 includes a set of instructions and wherein the processing resource 340 is designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for dynamics simulation comprising:
    identifying a number of ink related components and a number of printing interactions;
    calculating a first number of Hamaker constants that are based on the number of ink related components;
    generating a granular representation of the number of ink related components;
    calculating a second number of Hamaker constants based on the granular representation of the number of ink related components; and
    responsive to a determination that the first number of Hamaker constants and the second number of Hamaker constants are comparable, performing a dynamics simulation based on, at least, the second number of Hamaker constants, the granular representation of the number of ink related components, and the number of printing interactions.

2. The method of claim 1, wherein the number of printing interactions includes interactions between the number of ink related components.

3. The method of claim 1, wherein calculating the second number of Hamaker constants includes calculating the second number of Hamaker constants that are based on a number of inter-particle interaction energy functions.

4. The method of claim 1, wherein performing the dynamics simulation includes performing the dynamics simulation under a number of printing conditions.

5. The method of claim 1, further including calculating a set of properties of interest from the dynamics simulation.

6. A non-transitory machine-readable medium storing instructions for dynamics simulation executable by a computer to cause the computer to:
    identify a number of ink related components and a number of printing interactions;
    calculate a first number of Hamaker constants that are based on the number of ink related components;
    generate a granular representation of the number of ink related components;
    calculate a second number of Hamaker constants that are based on the granular representation of the number of ink related components;
    determine whether the first number of Hamaker constants and the second number of Hamaker constants are comparable; and
    responsive to a determination that the first number of Hamaker constants and the second number of Hamaker constants are comparable, perform a dynamics simulation based on the second number of Hamaker constants and the granular representation of the number of ink related components.

7. The medium of claim 6, wherein the instructions further executable to identify the number of ink related components, the ink related components including a multi-component ink composition and a medium on which the multi-component ink composition is deposited.

8. The medium of claim 7, wherein the instructions further executable to:
    identify the number of ink related components, the multi-component ink composition including a carrier, a pigment, a first polymeric resin, and a second polymeric resin;
    wherein the medium includes an intermediate transfer medium (ITM); and
    identify the number of printing interactions, the number of printing interactions include a drying interaction that takes place when the multi-component ink composition is placed on the ITM.

9. The medium of claim 6, wherein the instructions are further executed to:
    build a number of molecular models of the number of ink related components; and
    optimize a number of geometries of each of the number of ink related components to derive a number of low energy configurations of the number of individual molecular models,
    wherein the number of low energy configurations are used to calculate the first number of Hamaker constants using time-dependent density functional theory (TDDFT).

10. The medium of claim 9, wherein the instructions further executable to determine whether the first number of Hamaker constants and the second number of Hamaker constants are comparable includes determining whether the granular representation of the number of ink related components can be substituted for the number of molecular models of the number of ink related components.

11. A system for dynamics simulation, comprising:
    a processing resource in communication with a machine-readable medium, wherein the machine-readable medium includes a set of instructions, and wherein the processing resource is designed to execute the set of instructions to:
        identify a number of ink related components and a number of printing interactions;
    calculate a first number of Hamaker constants that are based on the number of ink related components;
    generate a granular representation of the number of ink related components;
    calculate a second number of Hamaker constants, wherein the second number of Hamaker constants describe long-range van der Waals forces for the granular representation of the number of ink related components;
    create an interaction parameter matrix, using the second number of Hamaker constants, including a number of interaction parameters between the granular representation of the number of ink related components; and
    responsive to a determination that the first number of Hamaker constants and the second number of Hamaker constants are comparable, perform a dynamics simulation based on the interaction parameter matrix.

12. The system of claim 11, wherein performing the dynamics simulation includes constructing a granular model of the number of printing interactions.

13. The system of claim 12, wherein performing the dynamics simulation includes providing the granular model of the number of printing interactions with the number of interaction parameters.

14. The system of claim 11, wherein performing the dynamics simulation includes performing the dynamics simulation under a number of printing conditions that correspond to the number of printing interactions.

15. The system of claim 11, wherein the number of printing interactions includes at least one of creating a liquid toner, placing the liquid toner on an intermediate transfer medium (ITM), and drying the liquid toner.

* * * * *